June 25, 1940.  B. H. BROWALL  2,205,514
OPERATING MECHANISM FOR LOAD BRAKE DEVICES
Filed Jan. 21, 1939  4 Sheets-Sheet 1
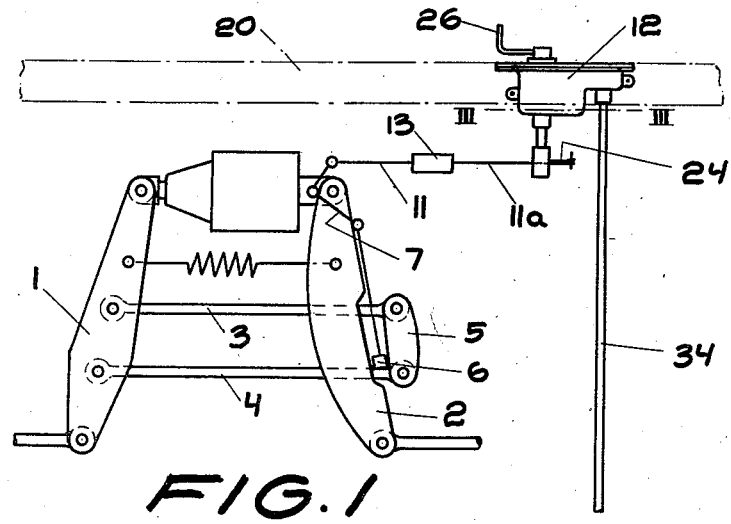
FIG.1
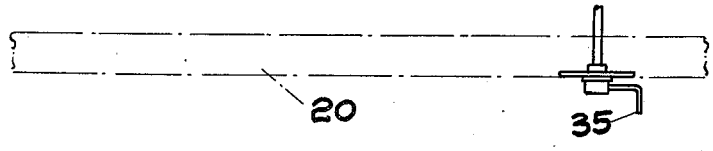
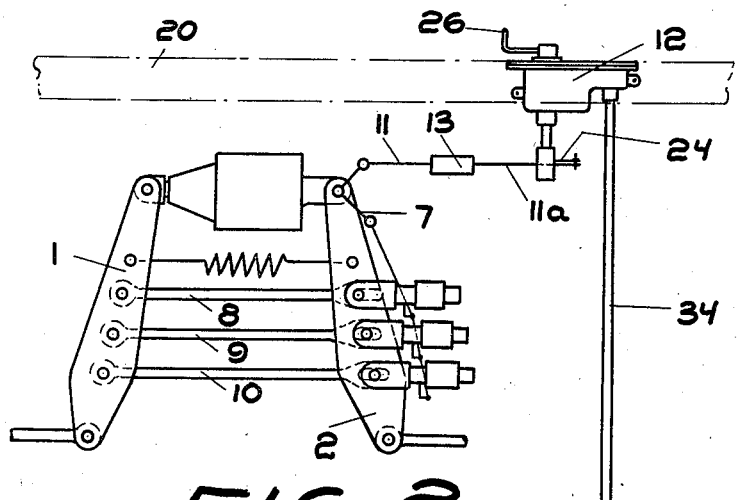
FIG.2
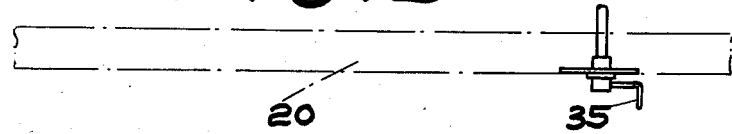
Inventor
Bert H. Browall
By C. F. Wenderoth
Atty

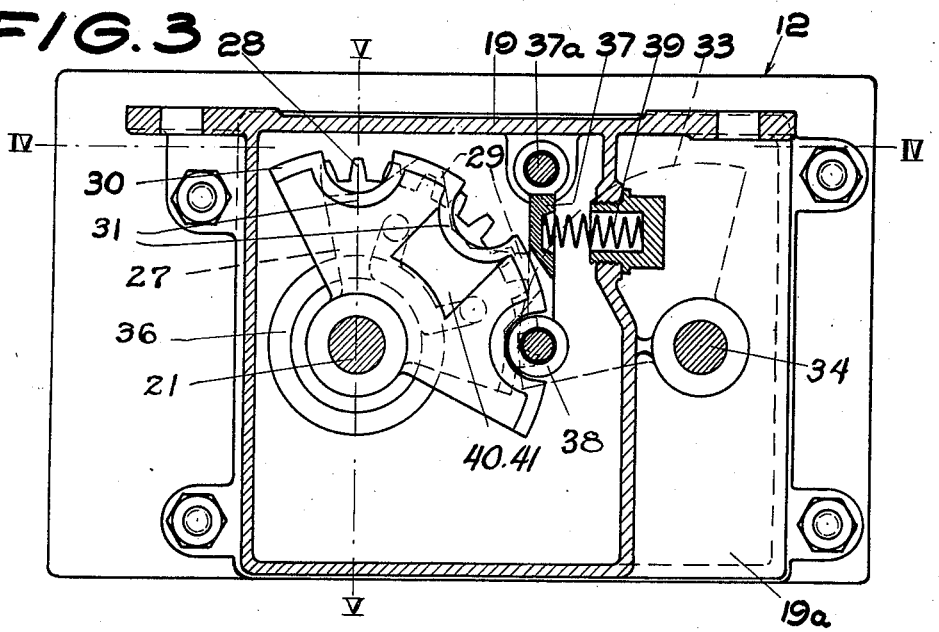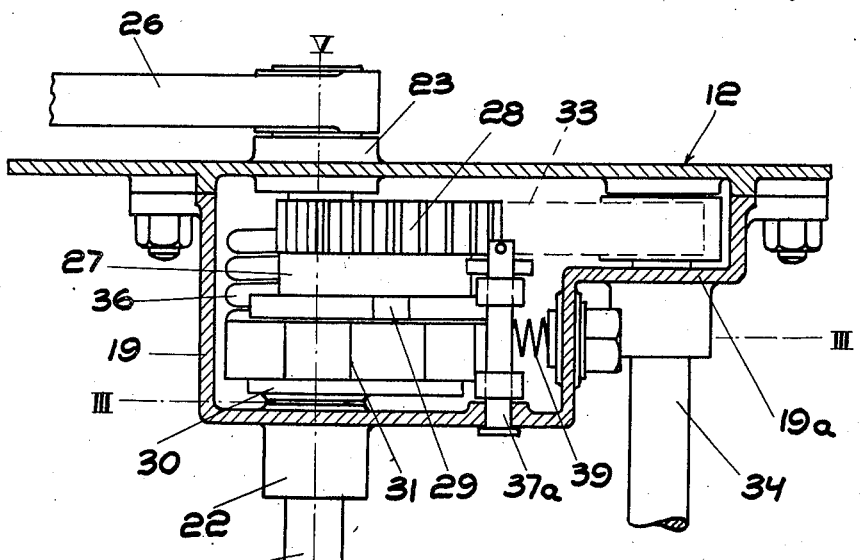

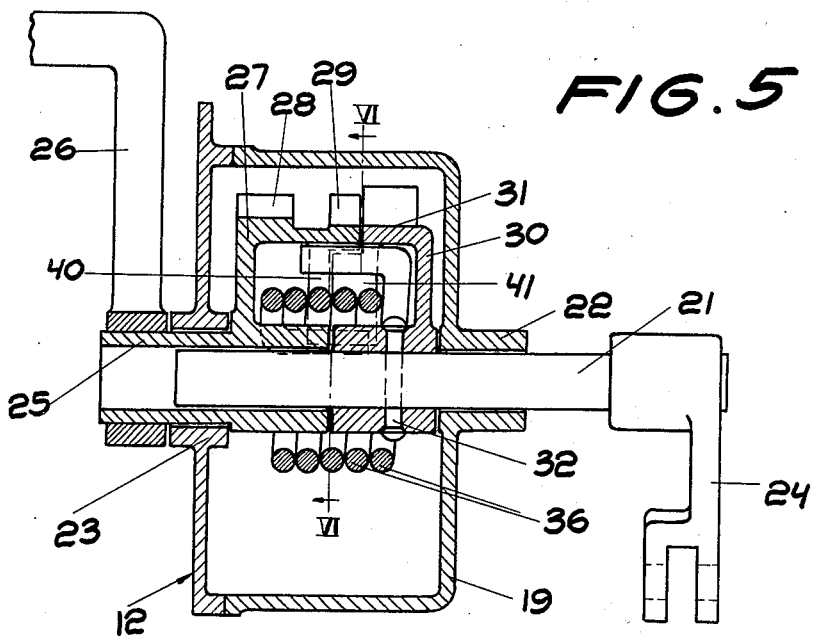
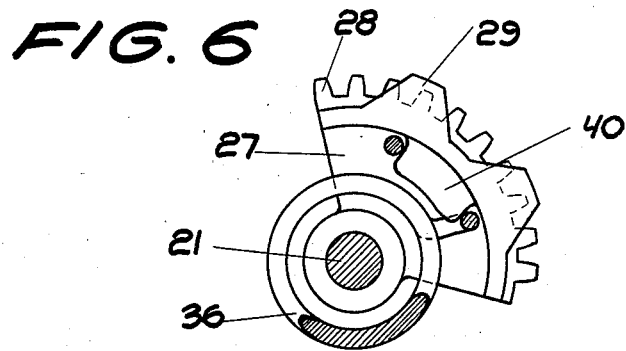
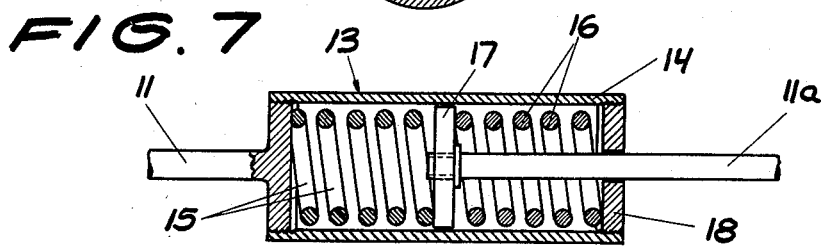

June 25, 1940.                B. H. BROWALL                2,205,514
                OPERATING MECHANISM FOR LOAD BRAKE DEVICES
                Filed Jan. 21, 1939         4 Sheets-Sheet 4
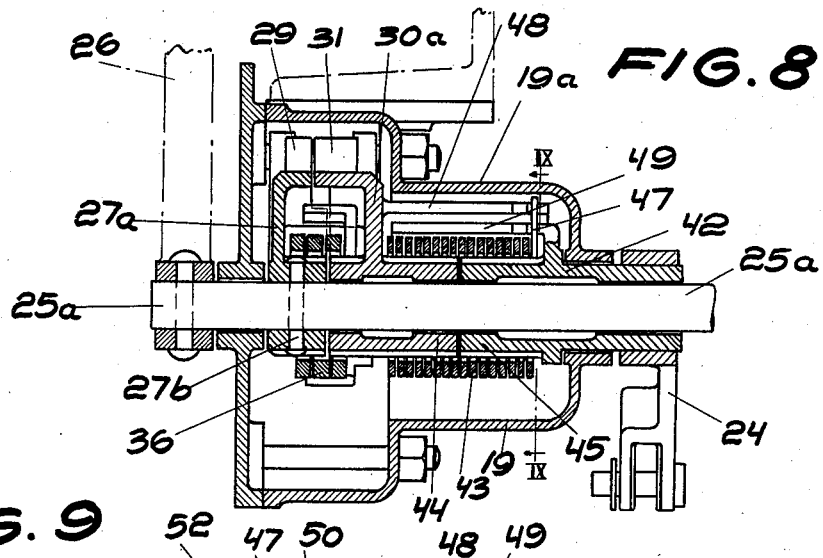
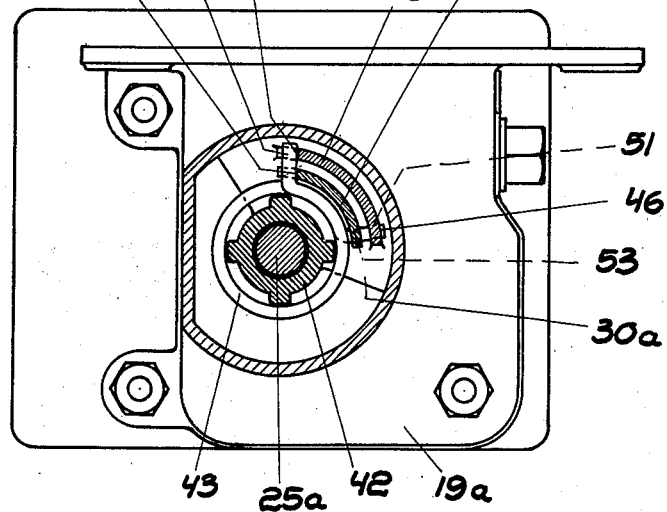
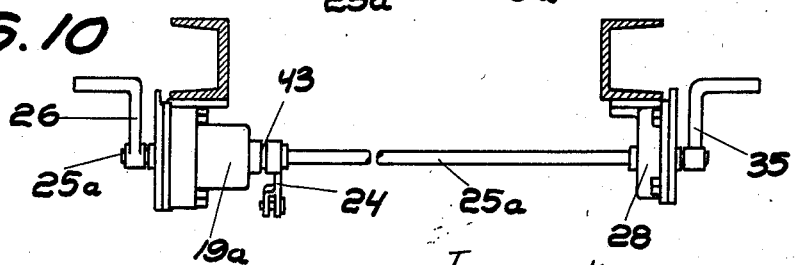
Inventor
Bert H. Browall
By C. F. Wenderoth
   Atty Patented June 25, 1940

2,205,514

UNITED STATES PATENT OFFICE 2,205,514

OPERATING MECHANISM FOR LOAD BRAKE DEVICES

Bert Henry Browall, Malmo, Sweden, assignor to Svenska Aktiebolaget Bromsregulator, Malmo, Sweden, a corporation of Sweden Application January 21, 1939, Serial No. 252,227
In Austria and Germany January 24, 1938

7 Claims. (Cl. 188—195)

This invention relates to brakes especially for railway vehicles, and more particularly to brakes of the kind including a device for adjusting the brake applying leverage of the brake rigging according to the load of the vehicle. Such a load brake device, because of taking part in the transmission of the braking force and being jammed thereby when the brake is on, is operable for changing the brake applying leverage of the brake rigging only in released position of the brake.

It is desirable, however, that the operating handles for the load brake device can be shifted also at times when the brake is on, for instance at a brake test on a freight train before departure, without it being necessary to wait for the brake to be released before shifting of the handles can be performed. The actual shifting of the load brake device into the new position corresponding to the new position of the operating handles is then to take place automatically upon the release of the brake. Constructions of operating mechanism for this purpose are already known in load brakes comprising an abutment movable alternately into and out of effective position. Such known constructions are designed for shifting said abutment from one to the other of two positions only. Sometimes, however, it is desirable to have the load brake device shiftable into either of more than two different positions. In such load brake devices it has been proposed to provide in the connection between the shiftable abutment and the operating handles therefor a means capable of yielding in both directions, so as to allow shifting of the operating handles also when the brake is on and the abutment jammed and immovable. This construction has the drawback that when leaving hold of the handles after moving them into a new position, the yielding means may move the handles back to their former position instead of subsequently moving the load brake device into the new position upon the release of the brake. This difficulty cannot advantageously be overcome by providing means for locking the handles in the different positions, since the device must be operable by either of the handles which are arranged on both sides of the vehicle so that also such locking means would have to be releasable from both sides of the vehicle, which would make the construction and handling of the operating mechanism too complicated.

One object of the invention is to provide an operating mechanism in which the difficulties and disadvantages referred to above are overcome.

Another object of the invention is to provide an operating mechanism comprising a means capable of yielding in both directions in the connection between the load brake device and the operating handles, and a locking means for preventing said yielding means from moving the operating handles instead of the load brake device.

Another object of the invention is to provide an operating mechanism comprising a locking means interposed between the yielding means and the operating handles and preventing the yielding means from moving the handles without locking the latter.

Still another object of the invention is to provide an operating mechanism which is sturdy in construction and simple to manipulate.

Other objects and advantages will appear in the following more detailed description of the invention as illustrated by way of examples in the accompanying drawings, in which:

Figs. 1 and 2 are diagrammatic views of two different types of the load brake devices that may be provided with the operating mechanism according to the invention.

Figs. 3, 4 and 5 are sections on a larger scale through the operating mechanism according to the invention, taken substantially on line III—III in Figs. 1 and 4, line IV—IV in Fig. 3, and line V—V in Figs. 3 and 4, respectively.

Fig. 6 is a detail sectional view substantially on line VI—VI in Fig. 5.

Fig. 7 is a view in longitudinal section of one form of yielding means in the connection of the load brake device to the operating handles therefor.

Fig. 8 is a sectional view illustrating a modification of the operating mechanism according to the invention.

Fig. 9 is a section on line IX—IX in Fig. 8.

Fig. 10 is a view on a reduced scale, illustrating the mounting of the operating mechanism of Figs. 8 and 9 on the under-frame of the vehicle.

In the type of load brake device illustrated in Fig. 1 two brake levers 1 and 2 are interconnected by means of two tie rods 3 and 4 projecting beyond the dead brake lever 2 and there linked to a short lever 5, and a member 6 slidably arranged between the lever 5 and the dead brake lever 2 for establishing connection between the latter and the tie rods 3 and 4. The member 6 can be shifted into a number of different positions defining a corresponding number of different brake applying leverages in the same manner as described in the U. S. Patent No. 1,898,528. For shifting the member 6 it is connected through a bell crank lever 7 and other connecting members to an operating mechanism 12 forming the subject matter of the invention.

In the type of load brake device illustrated in Fig. 2 the two brake levers 1 and 2 are interconnected by means of three tie rods 8, 9 and 10 each having a certain idle motion in relation to the dead brake lever 2. The idle motion of each of the tie rods can be reduced for rendering the tie rod effective by means of a shiftable abutment, and the three shiftable abutments for the three tie rods are so arranged and interconnected that they can be shifted simultaneously into either of three different positions, one of said abutments being effective in each of these positions. The tie rod the shiftable abutment of which is effective at a braking operation defines the brake applying leverage. For shifting the abutments they all are connected to a bell crank lever 7 which in turn is connected to the operating mechanism 12, the same as illustrated in Fig. 1. The construction, arrangement and interconnection of the shiftable abutments form the subject matter of an application of mine, filed December 23, 1938 and given Ser. No. 247,501 and are fully disclosed therein, and so it is unnecessary to describe and illustrate the same in detail herein. This application has matured into Patent No. 2,171,392, dated August 29, 1939.

In order to make possible shifting of the operating handles (26 and 35) for the load brake device also at times when the brake is applied, that is when the member 6 in Fig. 1, or the shiftable abutments for the tie rods 8, 9 and 10 in Fig. 2, are immovable because of being jammed through action of braking power, there is provided in the connection between the bell crank lever 7 and the operating mechanism 12 a device 13 capable of yielding in both directions. By yielding this device 13 allows the operating handles to be shifted also when the brake is applied, and as soon as the brake is then released the said device 13 effects the shifting of the load brake device into the position corresponding to the position into which the handles were shifted when the brake was in the applied condition.

One constructional form of the device 13 is shown in Fig. 7 and consists of a cylinder 14 having attached to one of its ends a connecting rod 11 and housing two coiled compression springs 15 and 16 on each side of a disk 17 which is slidable in the cylinder and has attached to it a connection rod 11a guided in an end wall 18 of the cylinder, the device 13 being connected between the bell crank lever 7 and the operating mechanism 12 by means of the said connecting rods 11 and 11a as illustrated in Figs. 1 and 2.

The operating mechanism 12 forming the subject matter of the invention, as illustrated in Figs. 3 to 5, comprises a casing 19 secured to the underframe 20 of the vehicle at one side thereof. A rotatable shaft 21, supported by journals 22 and 23 in the end walls of the casing, projects through one end wall of the casing and has secured on its projecting end an arm 24 to which the connecting rod 11a is linked. Journaled in the journal 23 and around the shaft 21 there is a hollow shaft 25 projecting through the other end wall of the casing and having secured to its projecting end an operating handle 26. The shafts 21 and 25 are relatively rotatable. Inside of the casing 19 the hollow shaft 25 is provided with a gear sector 27 provided with gear teeth 28 and also with a couple of radially projecting cams 29. Inside the casing 19 there is also a sector 30 secured on the shaft 21 for instance by means of a pin 32 (Fig. 5). The sector 30 is located adjacent the cams 29 on the sector 27 and is provided in its periphery with a number of semicircular recesses 31. Meshing with the teeth 28 on the sector 27 is a gear sector 33 located in an extension 19a of the casing 19 and secured on a shaft 34 extending to the opposite side of the vehicle and there provided with an operating handle 35 for enabling the load brake device to be operated from both sides of the vehicle.

Normally the two cams 29 on the sector 27 are right in front of the projections formed between the recesses 31 in the sector 30, the two sectors 27 and 30 normally being held in this position in relation to each other by a strong coiled spring 36 disposed around the shafts 21 and 25. The two sectors 27 and 30, however, can be rotated in both directions in relation to each other from the said normal position against the power of the spring 36. To this end each of the sectors 27 and 30 is provided with an inwardly projecting radial lug 40 and 41, respectively, and these lugs are located between and normally held right in front of each other by the suitably bent ends of the spring 36. Thus, if the sector 27 is rotated in relation to the sector 30, whether in one direction or the other, the lugs 40 and 41 are moved in relation to each other against the tension of the spring 36 by forcing the ends thereof apart. An arm 37 pivoted at one end by means of a pin 37a is provided at its other end with a roller 38 which is of the same diameter as the semicircular recesses 31 and of such a length that it can enter into any one of the recesses 31 and simultaneously into the path of the projecting cams 29, the arm 37 normally being held with the roller 38 in such engaged position by a spring 39. The cams 29 are provided with oblique side edges adapted to move the roller 38 out from the recess 31 upon rotation of the gear sector 27 in relation to the sector 30. As long as the roller 38 is engaged in any one of the recesses 31 in the sector 30 the latter is locked, that is held against rotation under the action of any torque on the shaft 21.

The operation of the mechanism is as follows:
When it is desired to change the setting of the load brake device from one to another of the available different brake applying leverages but the brake is on so that the shiftable parts of the load brake device are jammed and immovable, nevertheless shifting of the operating handles (26, 35) to the position corresponding to the desired new leverage setting can be performed, namely as follows: At rotation of the operating handles (by actuating any one of them) towards the position corresponding to the desired new setting the gear sector 27 partakes in the rotation, and the spring 36 tends to take the sector 30 along in the rotation. But to begin with the sector 30 is prevented from partaking in the rotation because of the roller 38 being in locking position in one of the recesses 31. On account thereof and under tensioning of the spring 36 the gear sector 27 is rotated somewhat in relation to the sector 30. This relative rotation results in the roller 38 being lifted out from its engaged position in the recess 31 in the sector 30 against the action of the spring 39 by the action of one of the oblique side edges of one of the projecting cams 29 on the sector 27, so that the sector 30 becomes unlocked and immediately reassumes its normal position in relation to the sector 27 and partakes in the further rotation thereof due to the spring 36 by which the sector 30 is resiliently coupled to the sector 27. This rotation of the sector 30 is possible in spite of parts (7, 11) of the connection of the jammed brake load device to the operating mechanism (12) being immovable, because of the fact that the power of the spring 36 is substantially greater than the power of the springs 15, 16 of the yielding device 13, so that the latter yields in that the disk 17 slides in the cylinder 14. The actuation of the operating handle 26, or 35, is continued until the position corresponding to the desired new leverage setting is attained, in which position the roller 38 enters the corresponding recess 31 in the sector 30 and thereby locks the latter against rotation under the action of any torque on the shaft 21. As will be understood from the foregoing the shifting movement thus performed is temporarily accumulated in the yielding device 13, that is until the subsequent release of the brake, at which occasion the actual shifting of the load brake device into the position corresponding to the desired new leverage setting is effected by the power which was accumulated in the yielding device at the shifting of the position of the operating handles while the brake was on. Due to the fact that the sector 30 in the new position of the operating handles (26, 35) is effectively locked against rotation under the action of any torque exerted thereon by the tension of any of the springs 15 and 16 of the yielding device 13 this device cannot effect rotation of the handles back to their former position instead of effecting the aforesaid shifting of the brake load device, but it must effect said shifting into the position corresponding to the new position of the handles.

In the modification illustrated in Figs. 8 to 10 the operating handle 26 is secured on a shaft 25a extending to the opposite side of the vehicle and there connected to the other operating handle 35 through a gear housed in a casing 28 and serving the purpose of transmitting rotation of the handle 35 in reversed direction to the shaft 25a. The said reversing gear corresponds to the gear 28, 33 in the form of Figs. 1 to 7, and as compared therewith the reversing gear in the modification of Figs. 8 to 10 is displaced from the operating mechanism casing 19 to the opposite side of the vehicle. In the casing 19 there is provided on the shaft 25a a sector 27a which is secured on the shaft by means of a pin 27b or the like and is provided with the radially projecting cams 29, a sector 30a which is rotatable on the shaft and provided with the semi-circular recesses 31 for cooperation with the locking device (not to be seen in Figs. 8 to 10 but corresponding exactly to the locking device 37, 38, 39 in the form of Figs. 1 to 7), and a sleeve 42 which is rotatable on the shaft and projects through the end wall of the casing 19 opposite to the handle 26. On the projecting end of the sleeve 42 is secured the arm 24 to which the load brake device is to be connected. The sector 30a is resiliently coupled to the sector 27a by means of a coiled spring 36 in the same manner and for the same purpose as the sector 27 is coupled to the sector 30 in the form of Figs. 1 to 7. In the modification illustrated in Figs. 8 to 10 the yielding device which allows shifting of the position of the operating handles also at times when the brake is on and the load brake device jammed and immovable, is located in the operating mechanism casing 19a and comprises a coiled spring 43 disposed around the hub 44 of the sector 30a and the inner end portion 45 of the sleeve 42. The ends 46, 47 of the spring 43 are bent radially outwards and straddle a pair of arms 48 and 49 provided on the sector 30 and the sleeve 42, respectively, so that the spring 43 tends to hold said arms right in front of each other and yields at rotation of the sector 30a in either direction in relation to the sleeve 42. The arms 48 and 49 have the form of portions of concentric cylinders, as will be best seen from Fig. 9, and said portions extend through an angle around the center, which is greater than the maximal angle through which the sector 30a may have to be rotated in relation to the sleeve 42. In order to prevent axial displacement of the spring 43 the ends 46, 47 thereof are seated in recesses 50, 51 and 52, 53 in the arms 48 and 49, respectively.

The operation of the modified form of the operating mechanism now described is as follows: When the operating handles 26 and 35 (by actuating one or the other of them) are shifted from one to another of their predetermined positions the shaft 25a is rotated and thereby the sector 27a. In the manner above described with reference to the form of Figs. 1 to 7 the locking device cooperating with the recesses 31 of the sector 30a is released by the cams 29 when the sector 27a has been rotated somewhat in relation to the sector 30a against the power of the coupling spring 36. As soon as the said locking device has been released the sector 30a reassumes its normal position in relation to the sector 27a and follows the further rotation thereof. Should the brake be on so that the load brake device and thereby the arm 24 and the sleeve 42 cannot be moved, nevertheless the sector 30a can partake in the rotation of the sector 27a through the shaft 25a and the handle 26 or 35, because of the fact that the power of the spring 36 always is greater than the power of the spring 43 so that the latter yields, thereby accumulating the shifting movement of the operating handle. This function of the spring 42 is the same whether the operating handle is shifted in one direction or the other, since the spring 43 is tensioned, that is the radially projecting ends 46 and 47 of the spring 43 forced apart by the arms 48 and 49, at rotation of the sector 30a in either direction from its normal position in relation to the sleeve 42. Upon release of the brake the shifting movement accumulated in the spring 43 is transmitted to the load brake device, whereby the latter is shifted into the brake applying leverage position corresponding to the position into which the operating handles were shifted while the brake was on.

While a couple of illustrative embodiments of the invention have been described in detail, it is not my intention to limit its scope to these embodiments or otherwise than by the terms of the appended claims.

What I claim and desire to secure by Letters Patent is:

1. An operating mechanism for load brake devices of the character described, comprising operating handles, means operatively connecting the load brake device to said handles, said means including a resilient device capable of yielding in both directions for enabling said handles to be shifted from one to another of a number of different positions also at times when the load brake device is jammed and immovable due to the brake being on, and a member interposed between said resilient device and said handles and so arranged that it and said handles are relatively movable within limits in both directions from a normal position in relation to each other, means for biasing said member and said handles in both directions towards their said normal position in relation to each other, a locking device cooperating with said member for automatically locking the same positively in either of a number of positions corresponding to the different positions into which said handles are shiftable, and means positively movable through said handles for releasing said locking device as a result of movement of said handles in either direction in relation to said member from said normal position relatively thereto.

2. An operating mechanism for load brake devices of the character described, comprising a shaft rotatable into a number of predetermined angular positions, means operatively connecting the load brake device to said shaft, said means including a resilient device capable of yielding in both directions for enabling the shaft to be rotated from one to another of said predetermined positions also at times when the load brake device is jammed and immovable due to the brake being on, and a member interposed between said resilient device and said shaft and rotatable thereon within limits in both directions from a normal position relatively thereto, means for biasing said shaft and said member in both directions towards their said normal position in relation to each other, a locking device cooperating with said member for automatically locking the same positively in a number of positions corresponding to said predetermined positions of said shaft, and means operatively connected to said shaft for releasing said locking device as a result of rotation of said shaft in either direction in relation to said member from said normal position relatively thereto 3. An operating mechanism as claimed in claim 1, in which said member is connected to said handles by the intermediary of a resilient coupling forming said means for biasing said member and said handles in both directions towards their said normal position in relation to each other, said resilient coupling being such that for yielding it requires a greater force to be applied on said handles than that for which said resilient device yields.

4. An operating mechanism as claimed in claim 2, in which said member rotatable on said shaft is resiliently coupled thereto by means of a coiled spring forming said means for biasing said shaft and said member in both directions towards their said normal position in relation to each other, said spring being such that for yielding it requires a greater torque to be applied on said shaft than that for which said resilient device yields.

5. An operating mechanism as claimed in claim 2, in which said member rotatable on said shaft consists of a sector provided in its periphery with a number of recesses, and in which said locking device comprises a spring actuated locking member movably mounted in a casing in which said shaft is journaled, and adapted to lock said rotatable member by entering into either of said recesses, said device for releasing said locking device comprising a sector secured on said shaft and provided with radially projecting cams adapted to move said locking member out of said recesses upon rotation of said shaft in either direction in relation to said first mentioned sector from said normal position relatively thereto.

6. An operating mechanism as claimed in claim 2, in which said shaft is journaled in a casing in which a sleeve is rotatably journaled coaxially with said shaft, said resilient device being in the form of a coiled spring disposed around said shaft in said casing and coupling said sleeve to said relatively rotatable member so as to bias said member and said sleeve in both directions towards a normal position of them in relation to each other.

7. An operating mechanism for load brake devices of the character described, comprising a rotatable member, a locking device for automatically locking said rotatable member in either of a number of positions corresponding to positions into which the load brake device is settable, means operatively connecting the load brake device to said rotatable member and capable of yielding in both directions for enabling said rotatable member to be rotated from one to another of said positions also at times when the load brake device is jammed and immovable due to the brake being on, handles for rotating said rotatable member and having a limited lost motion in relation thereto in both directions, and means operable by said lost motion for releasing said locking device for said rotatable member.

BERT HENRY BROWALL.